(12) United States Patent
Venkatachalam et al.

(10) Patent No.: US 10,989,673 B2
(45) Date of Patent: Apr. 27, 2021

(54) SUBSEA COMPUTED TOMOGRAPHY SYSTEM WITH FLAT PANEL DETECTORS

(71) Applicant: Oceaneering International, Inc., Houston, TX (US)

(72) Inventors: Rajashekar Venkatachalam, Cypress, TX (US); Michael William Killeen, Houston, TX (US); James Reid McNab, Aberdeenshire (GB)

(73) Assignee: Oceaneering International, Inc., Houston, TX (US)

( * ) Notice: Subject to any disclaimer, the term of this patent is extended or adjusted under 35 U.S.C. 154(b) by 100 days.

(21) Appl. No.: 16/407,306

(22) Filed: May 9, 2019

(65) Prior Publication Data

US 2019/0346383 A1    Nov. 14, 2019

Related U.S. Application Data

(60) Provisional application No. 62/668,980, filed on May 9, 2018.

(51) Int. Cl.
*G01N 23/046*    (2018.01)

(52) U.S. Cl.
CPC ..... *G01N 23/046* (2013.01); *G01N 2223/201* (2013.01); *G01N 2223/646* (2013.01)

(58) Field of Classification Search
None
See application file for complete search history.

(56) References Cited

U.S. PATENT DOCUMENTS

| 7,885,381 B2* | 2/2011 | Nagumo | G01N 23/046 378/59 |
| 2015/0373822 A1* | 12/2015 | Churchman | H05G 1/20 378/59 |
| 2016/0320282 A1* | 11/2016 | Dingman | G01N 23/12 |

* cited by examiner

*Primary Examiner* — Hoon K Song
(74) *Attorney, Agent, or Firm* — Maze IP Law, P.C.

(57) ABSTRACT

A Computed Tomography (CT) system can be deployed by subsea vehicles such as remotely operated vehicles (ROVs) or by divers to perform CT inspections on a subsea structure. In embodiments, a marinized signal source and a marinized flat panel signal detector are positioned at a structure to be inspected subsea and possibly repositioned at different angles about the structure to acquire a series of 2D radiographic images which are then fed to a reconstruction algorithm that produces a 3D reconstructed volume of the structure being inspected.

16 Claims, 3 Drawing Sheets

SUBSEA COMPUTED TOMOGRAPHY SYSTEM WITH FLAT PANEL DETECTORS

RELATION TO OTHER APPLICATIONS

This application claims priority through U.S. Provisional Application 62/668,980 filed on May 9, 2018.

BACKGROUND

Conventional radiography generates a two-dimensional (2D) image which provides qualitative data of an object that is inspected, but imposes challenges associated with making dimensional measurements as the 2D image has an overlap of all the three-dimensional (3D) features of the object that is being inspected. Current art does not utilize performing Computed Tomograghy (CT) scanning subsea with a high energy source and a flat panel detector.

FIGURES

Various figures are included herein which illustrate aspects of embodiments of the disclosed inventions.

DESCRIPTION OF EXEMPLARY EMBODIMENTS

The claimed invention comprises a Computed Tomography (CT) system that can be deployed by subsea vehicles such as remotely operated vehicles (ROVs) or by divers to perform CT inspections on a subsea structure. In its embodiments, the claimed invention places a marinized signal source and a marinized flat panel signal detector, as described herein, around a structure to be inspected subsea and positions the system at different angles to acquire a series of 2D radiographic images which are then fed to a reconstruction algorithm that produces a 3D reconstructed volume of the structure being inspected. The resolution of the reconstructed volume will depend on the number of angular views, the radiographic technique used for the inspection and the setup including use of radiation filters, buoyancy blocks, and the like.

Figure 1:
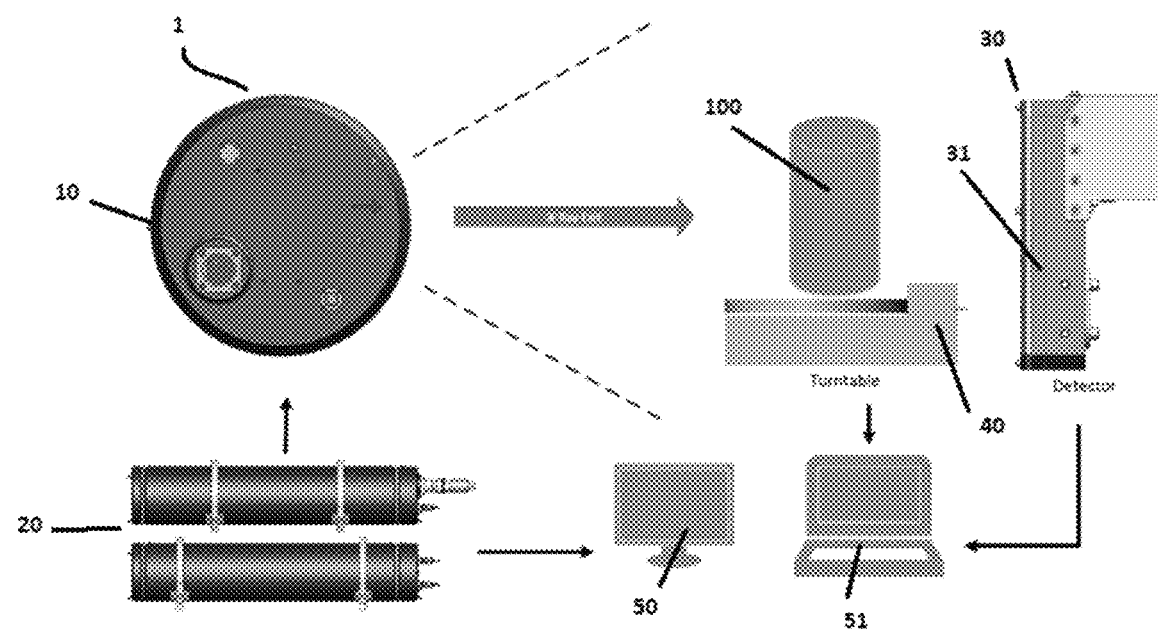
FIG. 1 is a block diagrammatic representation of an exemplary subsea computed tomography tool 1.

In a first embodiment, referring generally to FIG. 1, subsea computed tomography tool 1 comprises housing 10 configured for use subsea; marinized signal source 20 disposed at a first predetermined position at least partially within housing 10; marinized flat panel signal detector 30, comprising digital detector array 31, disposed proximate marinized signal source 20 at a second predetermined position at least partially within housing 10; rotator 40 operatively connected to marinized signal source 20 and marinized flat panel digital detector 30 where rotator 40 adapted to rotate marinized signal source 20 and marinized flat panel digital detector 30 about structure 100 to be inspected; and controller 50 operatively in communication with marinized signal source 20, marinized digital flat panel detector 30, and rotator 40.

Computer 51 may be located distally from housing 10 such as in a vessel or otherwise topside and is typically in communication with marinized signal source 20, marinized digital flat panel detector 30, rotator 40, and controller 50. Computer 51 typically comprises reconstruction software operatively resident in computer 51; a predetermined set of predefined slice data for a given structure; and visualization software operatively resident in computer 51 and operatively able to access the predetermined set of predefined slice data for the given structure.

The reconstruction software aids in performing the computer tomography and comprises a reconstruction algorithm optimized to produce the best results for a given structure that is inspected, by way of example and not limitation a cone beam reconstruction algorithm. As used herein, as an objective of the system is to detect defect in a structure such as a riser or pipe, "best results" refers to the resolution of the 3D image that would enable someone to identify a defect. In general, in an embodiment marinized digital flat panel detector 30 collects a series of 2D digital radiographic images at a finite number of angular position covering a complete 360 degree rotation about a cylindrical object such as a pipe or riser. These images are fed into a cone beam reconstruction algorithm to produce a 3D reconstructed volume of the object inspected. Basically the algorithm stiches the 2D digital images mathematically to give a shape of 3D image.

As used herein, the predefined slice data comprise data reflective of layers of the structures to be inspected. By way of example and not limitation, in flexible risers there may be several layers to be inspected. If a carcass layer inspection is desired, a system user may need to predefine that layer and once 3D reconstruction is done that layer can be visualized and inspected in greater detail.

In typical embodiments, marinized signal source 20 comprises a betatron source (7.5 mEV) or a radioactive source.

Figure 2:
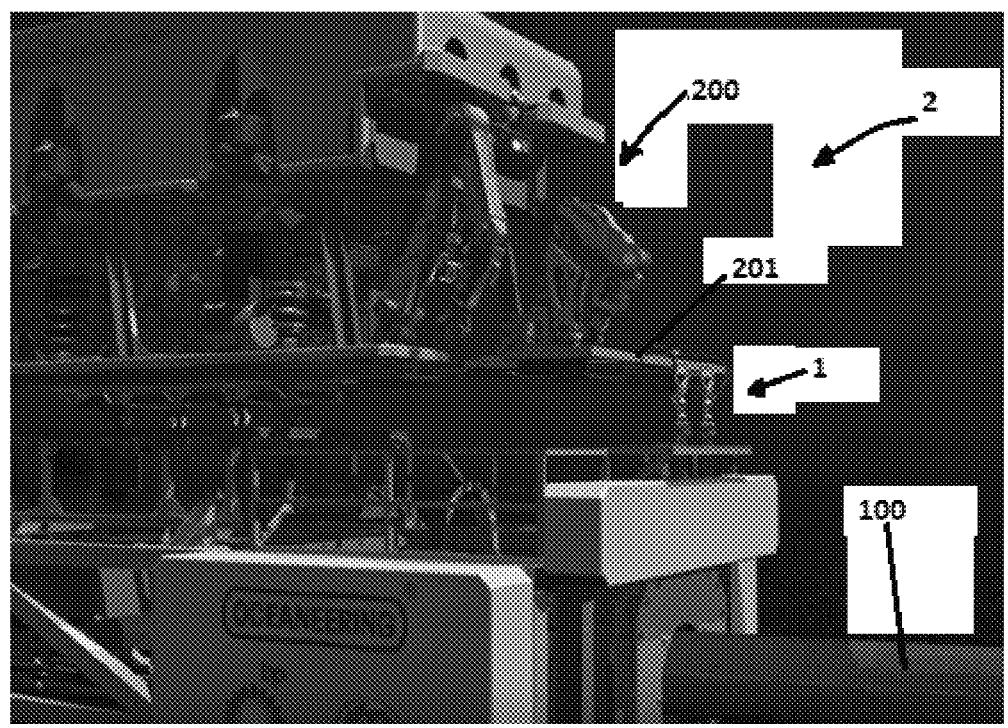
FIG. 2 is a view in partial perspective of an exemplary subsea vehicle deployable system 2 comprising an exemplary subsea computed tomography tool 1.
Figure 3:
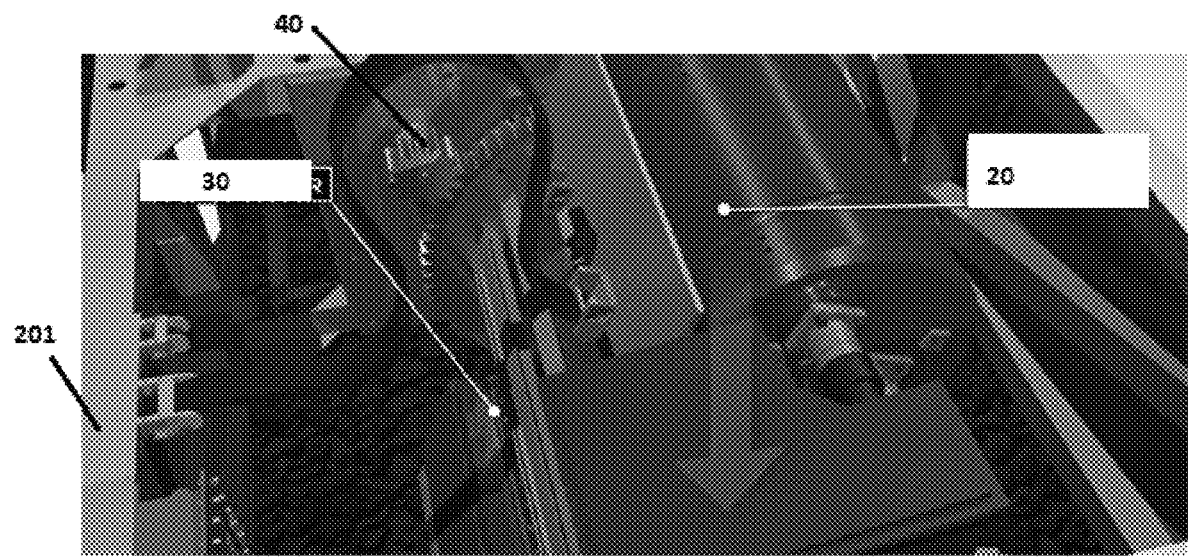
FIG. 3 is a view in partial perspective of a portion of the view from FIG. 2.

Referring now to FIGS. 2 and 3, subsea vehicle deployable system 2 for subsea computed tomography system with flat panel detectors comprises subsea vehicle deployable frame 201; subsea computed tomography tool 1, as described above, selectively attached to subsea vehicle deployable frame 201; and a predetermined set of subsea vehicle connector interfaces 201 operatively in communication with the marinized signal source, the marinized digital flat panel detector, the rotator, and the computer. The predetermined set of subsea vehicle connection interfaces comprise an electrical connection, an optical interface connection, or a hydraulic connection.

Subsea vehicle deployable system 2 typically further comprises one or more subsea vehicles such as a remotely operated vehicle (ROV) or an autonomous underwater vehicle (AUV). Subsea vehicle deployable frame 201 may be secured to and unfastened from subsea vehicle 200.

In the operation of exemplary methods, referring back to FIG. 1, subsea computed tomography typically comprises deploying subsea vehicle 200 subsea; attaching subsea computed tomography tool 1 to deployment frame 201, where subsea computed tomography tool 1 is as described above; computer 50 operatively in communication with the marinized signal source, the marinized digital flat panel detector, and the rotator, where computer 50 is as described above; securing deployment frame 201 to subsea vehicle 200; connecting a predetermined set of subsea vehicle electrical, optical, and hydraulic connections to the predetermined set of subsea vehicle connection interfaces; and navigating subsea vehicle 200 to a predetermined location proximate a subsea structure to be inspected.

Once at or proximate the predetermined location, system 2 is unfastened, e.g. unlatched, from deployment frame 201 and securing to structure 100.

Once secured, system 2 is used to acquire a predetermined series of 2D radiographic images of structure 100 by exposing structure 100 to a signal generated by marinized signal source 20 and the generated signal detected using marinized flat panel digital detector 30.

Figure 4:
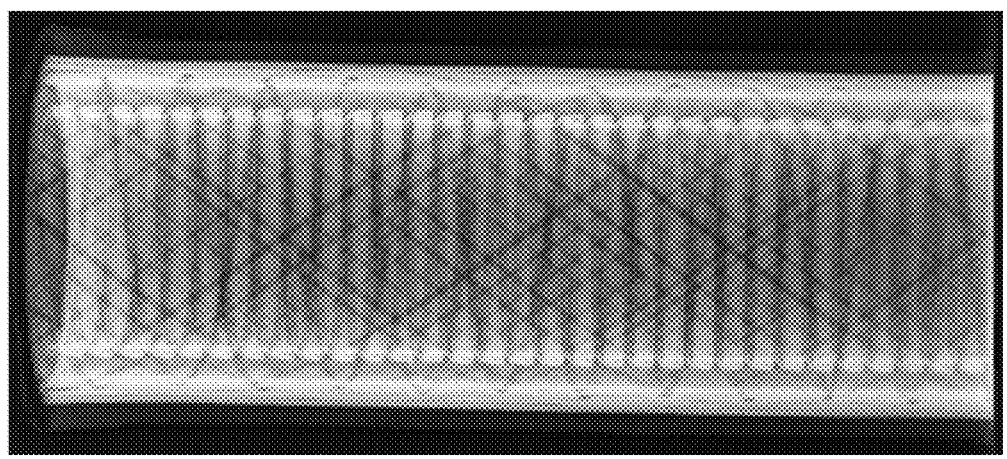
FIG. 4 is an illustrative view of 2D radiograph of a flexible riser.
Figure 5:
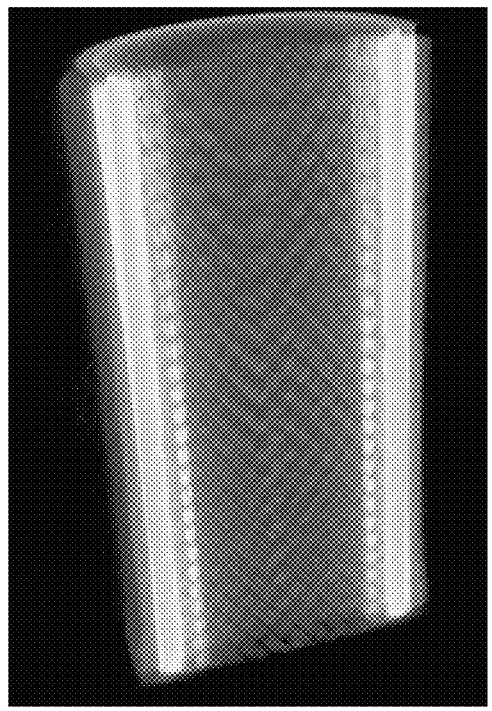
FIG. 5 is an illustrative view of a vertical slice of flexible riser.
Figure 6:
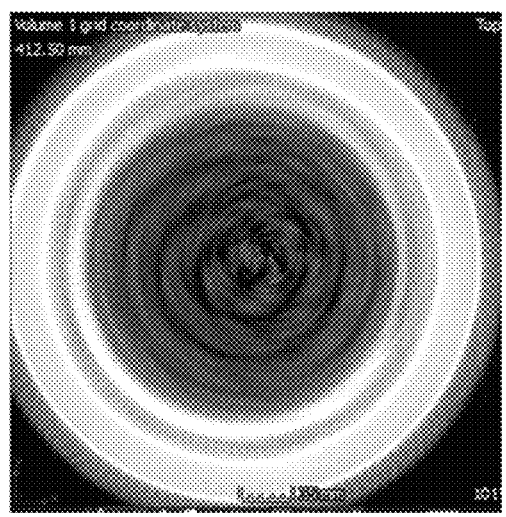
FIG. 6 is an illustrative view of a horizontal slice of flexible riser.

The acquired 2D radiographic images are typically then provided to computer 51 which uses the reconstruction software to create a voxelized 3D matrix which has density information of structure 100 that is inspected at a resolution as defined by the reconstruction software. The voxelized 3D matrix may then be output to a visual display. Exemplary images are provided in FIGS. 4-6.

In embodiments, a predetermined set of startup tests may be performed prior to navigating system 2 to structure 100 and calibration of subsea computed tomography tool 1 performed if such are indicated as being needed by the predetermined set of startup tests.

If there is a visual defect in the 2D radiograph images, subsea computed tomography tool 1 may be rotated around an axial location of structure 100 where the defect was detected and further 2D radiographic images acquired for a predetermined set of increments in angle of rotation of marinized signal source 20 and the generated signal detected using marinized flat panel digital detector 30 with respect to structure 100.

In embodiments, the acquired predetermined series of 2D radiographic images may be transmitted in real time to a visual display at a control station.

In embodiments, subsea vehicle 200 and subsea computed tomography tool 1 may be deployed individually. Subsea computed tomography tool 1 may be unlatched from deployment frame 201 and electrical, optical and hydraulics from subsea vehicle 200 connected to subsea computed tomography tool 1. Startup tests for subsea computed tomography tool 1 may then be performed followed by any calibration that might be needed. Subsea vehicle 200 can then fly subsea computed tomography tool 1 to structure 100 which is to be inspected and clamped or otherwise fastened or latched onto structure 100, e.g. a pipe. A series of 2D images are then acquired which, in embodiments, can be seen in real time from a remote location such as a control station at the vessel. If there is any defect seen in the 2D radiograph, subsea computed tomography tool 1 may be rotated around a same axial location of structure 100 and 2D radiographs acquired for every small increment in angle of rotation of marinized signal source 20 and the generated signal detected using marinized flat panel digital detector 30 with respect to structure 100.

As used herein, given that marinized signal source 20 and marinized flat panel digital detector 30 typically rotate to cover a complete 360 degree angle about structure 100, once scanning is done at a single point system 1 can move along structure 100, e.g. a pipe or riser, and complete 360 degree scanning. By this way the whole area of interest can be covered spatially. Therefore, for one scanning time if a section of the object is clamped it will be inspected in the subsequent scanning.

For a given structure inspected, predefined 2D slice data may be determined of the volume that should be inspected to provide information on the structure inspected. For example, in the case of pipelines, a cross-section slice of the pipe can be used to directly measure the wall thickness of the pipe at that location.

Subsea computed tomography tool 1 may be used for a variety of applications and may be modified as required for a given application. Some of the applications where this tool could be used for inspection are flooded/non flooded analysis; flooding of armor wires in flexible risers; tensile armor wires (multiple layers) such as for thickness, disorganization, necking, missing wires; pressure armor unlock; carcass unlock or collapse (detection and measurement); blockage detection and flaw assurance applications such as wax or hydrates build-up; end fitting damage, pull out; composite pressure wraps such as reclassification to permanent from temporary solution; weld root corrosion; corrosion under insulation; large diameter coated pipe corrosion; pipe-in-pipe inspection; multi-riser caissons inspection; splash zone riser and caisson inspection; pipelines corrosion inspection; and/or umbilical inspection.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A subsea computed tomography tool, comprising:
   a. a housing configured for use subsea;
   b. a marinized signal source disposed at a first predetermined position at least partially within the housing;
   c. a marinized flat panel signal detector, comprising a digital detector array, disposed proximate the marinized signal source;
   d. a rotator operatively connected to the marinized signal source and the marinized flat panel digital detector, the rotator adapted to rotate the marinized signal source and the marinized flat panel digital detector about a structure to be inspected;
   e. a controller operatively in communication with and the marinized signal source, the marinized digital flat panel detector, and the rotator;
   f. a computer operatively in communication with the marinized signal source, the marinized digital flat panel detector, and the rotator, the computer comprising:
      i. reconstruction software operatively resident in the computer and operatively in communication with the marinized signal source and the marinized digital flat panel detector;
      ii. a predetermined set of predefined slice data for a predetermined structure; and
      iii. visualization software operatively resident in the computer and operatively able to access the predetermined set of predefined slice data for the given structure.

2. The subsea computed tomography tool of claim 1, wherein the marinized flat panel signal detector is further disposed at least partially within housing.

3. The subsea computed tomography tool of claim 1, wherein the computer is further operatively in communication with the controller.

4. The subsea computed tomography tool of claim 1, wherein the marinized signal source comprises a betatron source or a radioactive source.

5. The subsea computed tomography tool of claim 1, wherein the betatron source comprises a 7.5 mEV betatron source.

6. The subsea computed tomography tool of claim 1, wherein the computer is located distally from the housing.

7. The subsea computed tomography tool of claim 1, wherein the reconstruction software comprises a reconstruction algorithm optimized to produce the best results for the structure to be inspected.

8. A subsea vehicle deployable system for subsea computed tomography system with flat panel detectors, comprising:
   a. a subsea vehicle deployable frame;
   b. a subsea computed tomography tool, comprising:
      i. a housing configured for use subsea;
      ii. a marinized signal source disposed at a first predetermined position at least partially within the housing;
      iii. a marinized flat panel signal detector, comprising a digital detector array, disposed proximate the marinized signal source;
      iv. a rotator operatively connected to the marinized signal source and the marinized flat panel digital detector, the rotator adapted to rotate the marinized signal source and the marinized flat panel digital detector about a structure to be inspected;
      v. a controller operatively in communication with and the marinized signal source, the marinized digital flat panel detector, and the rotator;
   c. a computer operatively in communication with the marinized signal source, the marinized digital flat panel detector, and the rotator, the computer comprising:
      i. reconstruction software operatively resident in the computer and operatively in communication with the marinized signal source and the marinized digital flat panel detector;
      ii. a predetermined set of predefined slice data for a predetermined structure; and
      iii. visualization software operatively resident in the computer and operatively able to access the predetermined set of predefined slice data for the given structure; and
   d. a predetermined set of subsea vehicle connector interfaces operatively in communication with the marinized signal source, the marinized digital flat panel detector, the rotator, the controller, and the computer.

9. The subsea vehicle deployable system for subsea computed tomography system with flat panel detectors of claim 8, wherein the predetermined set of subsea vehicle connection interfaces comprise an electrical connection, an optical interface connection, or a hydraulic connection.

10. The subsea vehicle deployable system for subsea computed tomography system with flat panel detectors of claim 8, further comprising a subsea vehicle, the subsea vehicle deployable frame connected to the subsea vehicle.

11. The subsea vehicle deployable system for subsea computed tomography system with flat panel detectors of claim 10, wherein the subsea vehicle comprises a remotely operated vehicle (ROV) or an autonomous underwater vehicle (AUV).

12. A method of subsea computed tomography system with flat panel detectors, comprising:
   a. deploying a subsea vehicle subsea;
   b. securing a subsea vehicle deployable system for subsea computed tomography system with flat panel detectors to the subsea vehicle subsea, the subsea vehicle deployable system for subsea computed tomography system with flat panel detectors comprising:
      i. a subsea vehicle deployable frame to which the subsea vehicle is secured;
      ii. a subsea computed tomography tool, comprising:
         1. a housing configured for use subsea;
         2. a marinized signal source disposed at a first predetermined position at least partially within the housing;
         3. a marinized flat panel signal detector, comprising a digital detector array, disposed proximate the marinized signal source;
         4. a rotator operatively connected to the marinized signal source and the marinized flat panel digital detector, the rotator adapted to rotate the marinized signal source and the marinized flat panel digital detector about a structure to be inspected;
         5. a controller operatively in communication with and the marinized signal source, the marinized digital flat panel detector, and the rotator;
      iii. a computer operatively in communication with the marinized signal source, the marinized digital flat panel detector, and the rotator, the computer comprising:
         1. reconstruction software operatively resident in the computer and operatively in communication with the marinized signal source and the marinized digital flat panel detector;
         2. a predetermined set of predefined slice data for a predetermined structure; and
         3. visualization software operatively resident in the computer and operatively able to access the predetermined set of predefined slice data for the given structure; and
      iv. a predetermined set of subsea vehicle connector interfaces operatively in communication with the marinized signal source, the marinized digital flat panel detector, the rotator, the controller, and the computer;
   c. connecting a predetermined set of subsea vehicle electrical, optical, and hydraulic connections to the predetermined set of subsea vehicle connection interfaces;
   d. navigating the subsea vehicle to a predetermined location proximate a subsea structure to be inspected;
   e. unfastening the subsea computed tomography tool from the subsea vehicle deployable frame;
   f. securing the subsea computed tomography tool to the subsea structure;
   g. using the subsea computed tomography tool to acquire a predetermined series of two-dimensional (2D) radiographic images of the subsea structure by:
      i. exposing the subsea structure to a signal generated by the marinized signal source; and
      ii. detecting the generated signal using the marinized flat panel digital detector;
   h. providing the acquired 2D radiographic images to the computer;
   i. using the reconstruction software to create a voxelized three-dimensional (3D) matrix comprising density information of the subsea structure at a resolution as defined by the reconstruction software; and
   j. outputting the voxelized 3D matrix to a visual display.

13. The method of subsea computed tomography system with flat panel detectors of claim 12, further comprising:
   a. performing a predetermined set of startup tests prior to navigating the subsea computed tomography tool to the subsea structure; and
   b. performing a calibration of the subsea computed tomography tool which are indicated as being needed by the predetermined set of startup tests.

14. The method of subsea computed tomography system with flat panel detectors of claim 12, further comprising:

a. determining if there is a visual defect in the 2D radiograph images; and
b. if a visual defect is detected:
  i. rotating the subsea computed tomography tool around an axial location of the subsea structure where the visual defect was detected; and
  ii. acquiring further 2D radiographic images for a predetermined set of increments in angle of rotation of the marinized signal source and the marinized flat panel signal detector with respect to the subsea structure.

15. The method of subsea computed tomography system with flat panel detectors of claim 12, further comprising transmitting the acquired predetermined series of 2D radiographic images in real time to a visual display at a control station.

16. The method of subsea computed tomography system with flat panel detectors of claim 12, wherein the reconstruction software comprises a reconstruction algorithm optimized to produce the best results for a given structure that is inspected.

* * * * *